(12) United States Patent
Walsh et al.

(10) Patent No.: US 9,251,486 B2
(45) Date of Patent: Feb. 2, 2016

(54) SERVICE REQUEST ORCHESTRATOR WITH SMART METERS

(71) Applicant: Oracle International Corporation, Redwood Shores, CA (US)

(72) Inventors: Richard E Walsh, San Francisco, CA (US); David P Siska, Oakland, CA (US)

(73) Assignee: Oracle International Corporation, Redwood Shores, CA (US)

( * ) Notice: Subject to any disclaimer, the term of this patent is extended or adjusted under 35 U.S.C. 154(b) by 224 days.

(21) Appl. No.: 13/856,529

(22) Filed: Apr. 4, 2013

(65) Prior Publication Data

US 2014/0095245 A1    Apr. 3, 2014

Related U.S. Application Data

(60) Provisional application No. 61/744,750, filed on Oct. 3, 2012.

(51) Int. Cl.
 *G06Q 10/06* (2012.01)
(52) U.S. Cl.
 CPC ................ *G06Q 10/06315* (2013.01)
(58) Field of Classification Search
 CPC ..................................................... G06Q 10/00
 See application file for complete search history.

(56) References Cited

U.S. PATENT DOCUMENTS

| | | | |
|---|---|---|---|
| 4,044,337 A | 8/1977 | Hicks et al. | |
| 5,201,010 A | 4/1993 | Deaton et al. | |
| 6,055,573 A | 4/2000 | Gardenswartz et al. | |
| 6,678,882 B1 | 1/2004 | Hurley et al. | |
| 6,943,687 B2 | 9/2005 | Lee et al. | |
| 7,003,476 B1 | 2/2006 | Samra et al. | |
| 7,403,904 B2 | 7/2008 | Abe et al. | |
| 7,707,200 B2 | 4/2010 | Jain et al. | |
| 8,312,103 B2 | 11/2012 | Holbrook et al. | |
| 2004/0215526 A1 | 10/2004 | Luo et al. | |
| 2004/0243485 A1 | 12/2004 | Borenstein et al. | |
| 2007/0281710 A1* | 12/2007 | Bai et al. | 455/452.1 |
| 2012/0101653 A1* | 4/2012 | Tran | 700/296 |

* cited by examiner

*Primary Examiner* — Thomas Dixon
(74) *Attorney, Agent, or Firm* — Miles & Stockbridge, P.C.

(57) ABSTRACT

A system for orchestrating the process of fulfilling service requests for utility services receives a first service request for utility services. The first service request references a first service point. The system evaluates conditions at the first service point. The system issues an electronic command message to fulfill the first service request based on the evaluation of conditions at the first service point. The system receives a second service request for utility services. The second service request references a second service point. The system evaluates conditions at the second service point. The system initiates a field activity to fulfill the second service request based on the evaluation of conditions at the second service point. The receiving the first service request, the evaluating conditions at the first service point, the issuing the electronic command message, the receiving the second service request, the evaluating conditions at the second service point, and the initiating the field activity are performed by a centralized orchestration engine.

16 Claims, 7 Drawing Sheets

SERVICE REQUEST ORCHESTRATOR WITH SMART METERS

CROSS REFERENCE TO RELATED APPLICATIONS

This application claims priority of Provisional Patent Application Ser. No. 61/744,750, filed on Oct. 3, 2012, the content of which is hereby incorporated by reference.

FIELD

One embodiment is directed generally to a computer system, and in particular to a computer system that receives different service requests and orchestrates the process of fulfilling the service requests.

BACKGROUND INFORMATION

"Orchestration" may generally describe the arranging, the directing, and the managing of computer systems and services. Orchestration may be directed to associating different types of user requests with different applications, data, and infrastructure. These user requests may be received from customers or clients, or may be created internally within an organization. The user requests may be maintenance or repair requests.

An example of an organization that may orchestrate services corresponding to user requests is a utility company. Utility companies are organizations that provide services relating to electricity consumption, gas consumption, water consumption, and sewage treatment. In the course of providing these different types of services, utility companies receive a wide variety of different user requests.

SUMMARY

One embodiment is a system for orchestrating the process of fulfilling service requests for utility services. The system receives a first service request for utility services. The first service request references a first service point. The system evaluates conditions at the first service point. The system issues an electronic command message to fulfill the first service request based on the evaluation of conditions at the first service point. The system receives a second service request for utility services. The second service request references a second service point. The system evaluates conditions at the second service point. The system initiates a field activity to fulfill the second service request based on the evaluation of conditions at the second service point. The receiving the first service request, the evaluating conditions at the first service point, the issuing the electronic command message, the receiving the second service request, the evaluating conditions at the second service point, and the initiating the field activity are performed by a centralized orchestration engine.

DETAILED DESCRIPTION

Figure 1:
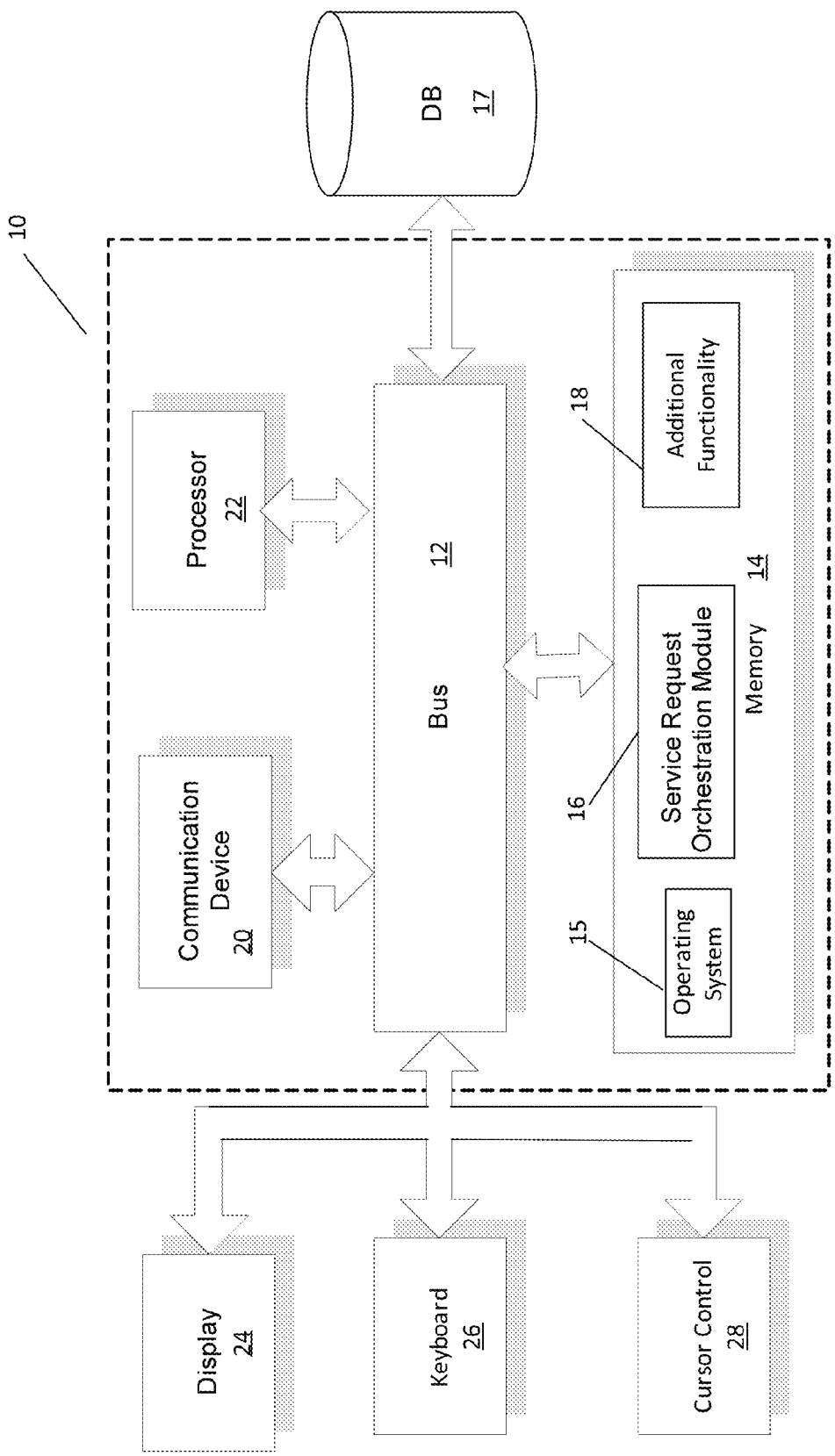
FIG. 1 is an overview block diagram of a computer system for orchestration of service requests in accordance with an embodiment of the present invention.

One embodiment is a system that orchestrates the process of fulfilling service requests. Each service request may refer to a service point, and the fulfillment of a particular service request may depend upon variable conditions that exist at the service point of the particular service request. Although there may be different types of service requests (which are to be fulfilled in different ways), the system uses a centralized orchestration engine to receive the different types of service requests and to evaluate the variable conditions that exist at the service points corresponding to the different service requests. As such, the system uses the centralized orchestration engine to fulfill different types of service requests, under different types of variable conditions. Therefore, the system simplifies the process of fulfilling varied service requests.

In known methods for orchestrating the process of fulfilling service requests, different types of service requests are typically processed by separate systems. Each system of the separate systems is usually specialized in processing a specific type of service request. Each system of the separate systems may have its own interface, its own appointment processing procedure, and its own exception-processing procedure. As such, in order to manage all of the service requests associated with a particular service delivery point or a particular device, a user would generally need to look through all of the different interfaces of the separate systems.

In contrast with the previously known approaches, an embodiment of the present system for orchestrating the process of fulfilling service requests consolidates the view of all of the plurality of work requests to be fulfilled is presented. Embodiments provide a centralized system for processing the fulfillment of service requests.

By using a centralized system, one embodiment of the present invention allows a user to make timely and accurate decisions to fulfill service requests without requiring the user to look through different user interfaces of disparate systems. One embodiment also allows upgrades to be performed at significantly lower cost as a result of simplified design, development, quality-assurance testing, and implementation of the centralized system, as compared to a non-centralized system. For example, if additional functionality needs to be supported by the centralized system (e.g., a new device needs to be communicated with by the centralized system), one embodiment allows a user to extend the centralized system's metadata so that the system can communicate with the new device without any need for more complicated modifications. Without a centralized system, adding functionality to the system may require complex and costly modifications.

By providing a consolidated view of all service requests, embodiments of the present invention provide a user with real-time and accurate decision-making capabilities to fulfill a service request at a service point. In contrast, with the previously known approaches, the decision-making capabilities are scattered among disparate systems. With the decision-making capabilities scattered among disparate systems, the likelihood of achieving an accurate decision is reduced because conditions at a service point may be continually changing.

In one embodiment of the present invention, a centralized system may also require less user involvement when fulfilling a service request at a service point. In contrast, with the previously known approaches, because the decision-making capabilities are scattered among disparate systems, the likelihood that at least one of these disparate systems requires user involvement may be high. Not all of the disparate systems may be able to automate the fulfillment of service requests at service points.

In one embodiment of the present invention, if a user wishes to determine how a specific service request was fulfilled, a single consolidated view provided by a centralized system allows a user to see, in a single place, the various steps that were taken to fulfill the specific service request. In contrast, with the previously known approaches, a user would generally need to navigate through many disparate systems in order to examine the various steps that were taken to fulfill a specific service request.

By using a centralized system, as implemented by one embodiment of the present invention, a user responsible for trouble-shooting may go to a single place to override automated decisions. In contrast, with the previously known approaches, if a decision-making process is scattered among disparate systems, a user may need to understand how to operate all systems and be able to navigate through each system in order to override automated decisions.

FIG. 1 is an overview block diagram of a computer system 10 for orchestration of service requests in accordance with an embodiment of the present invention. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 may be further coupled via bus 12 to a display 24, such as a Liquid Crystal Display ("LCD"). A keyboard 26 and a cursor control device 28, such as a computer mouse, may be further coupled to bus 12 to enable a user to interface with system 10.

In one embodiment, memory 14 stores software modules that provide functionality when executed by processor 22. The modules include an operating system 15 that provides operating system functionality for system 10. The modules further include service request orchestration module 16 that orchestrates the process of fulfilling service requests, as disclosed in more detail below.

System 10 can be part of a larger system such as a utilities management system. Therefore, system 10 will typically include one or more additional functional modules to include the additional functionality. One embodiment is implemented in conjunction with functionality provided by "Oracle Utilities Suite" from Oracle Corp., and so the functionality can be in module 18 or be remote from system 10. A database 17 is coupled to store data used with modules 16 and 18. Specifically, database 17 may store information relating to received service requests or business rules.

Different organizations within the utilities industry have recently been developing the ability to fulfill different types of service requests using new capabilities offered by smart devices (e.g., smart electric meters). Smart devices are generally considered to be devices that can receive and/or transmit information electronically. Different organizations are attempting to upgrade their systems to take advantage of the additional capabilities provided by these smart devices. These different organizations are also interested in using user interfaces that can manage automated metering infrastructure ("AMI") head-end systems, meter data management ("MDM") applications, and work management systems, which, in turn, manage the devices. Embodiments of the present invention may orchestrate the fulfilling of received service requests with AMI head-end systems as new smart devices are installed or exchanged with old meters.

A service request may be generally understood as a request directed to changing a state of service at a particular service point. Service requests may have a relatively short cycle/timeframe for completion. Specifically, in one embodiment, most service requests should be accomplished in a day, but other service requests may require a longer period of time to complete if multiple dependent steps are needed to be performed for completion of the requests. Service requests may refer to a particular target date and service point for completion. Service requests may also require field visits to the service point. In cases where the service point has a smart device, service requests may cause an issuance of an electronic command to the device.

In order for a particular service request to be fulfilled, embodiments of the present invention orchestrate the process of fulfilling the service request. In one embodiment, orchestrating the process of fulfilling the service request includes orchestrating any field activities and any messaging that is necessary for fulfilling the service request.

Specifically, one embodiment determines which service requests can be automatically fulfilled via electronic messaging and which service requests should be routed to a workforce management application for assignment to field crews. The determination may be based upon utility industry business rules that evaluate the type and status of an installed device at the service point corresponding to the service request. Specifically, if the system determines that a service request can be fulfilled electronically (because a smart device exists at the service point), the system can automatically initiate appropriate command messages to the smart device. On the other hand, if the service request cannot be fulfilled electronically, embodiments may automatically initiate field visits to the particular service point by designated field crew personnel.

If a device exists at the particular service point, the system appropriately orchestrates the fulfillment of service requests regardless of whether the device is a smart (e.g., a smart electric meter) or a non-smart device (e.g., a mechanical meter). The system can orchestrate fulfillment of service requests for smart and/or non-smart devices.

For example, if the system receives a service request to start utility services at a service point, the system may first determine if a device (e.g., a meter) exists at the service point. If there is no device at the service point, a field activity may be created/initiated to install and connect an electric meter at the service point.

The created field activity may be based on different parameters such as (1) a service point's connection state, (2) a service point's disconnect location (e.g., if the service point is disconnected, the location at which the disconnect occurs), (3) the existence of a device at the service point, and/or (4) if a non-smart device is installed, whether it is "on" or "off."

If an electric smart meter already exists at the service point, but is in a disconnected state, the system may create/transmit a command message to an appropriate head-end (associated with the electric smart meter) to connect the electric smart meter. A head-end can be understood as an intermediary system that controls smart meters. On the other hand, if a non-smart device (such as a non-smart mechanical meter) already exists at the service point, a field activity may be created to request a reading that occurs on or near the start date for commencing the utility services (assuming that the next scheduled meter read date is not close to the start date). The requested reading that occurs on or near the start date for commencing utility services will allow a user to determine the amount of utilities used. For example, if a reading that occurs on the start date reads "11111" and a subsequent reading (occurring 15 days after the start date) reads "11222," a user may determine that 111 units of utilities were consumed in the 15-day period.

As described in the above example, the process for fulfilling a particular service request may depend upon a variety of variable conditions. Variable conditions which determine the process for fulfilling a service request include, but are not limited to: (1) the type of service requested (e.g., start, stop, cut, back-to-back, etc.), (2) whether the service point is connected to a source of power, (3) whether a device is installed at the service point and the specific characteristics of the device (e.g., a smart-meter, a non-smart meter), (4) the state of any device that is installed at the service point (e.g., pre-commissioned, connected, disconnected), (5) any characteristics of a head-end that manages the device at the service point, and (6) for non-smart devices, the proximity of the scheduled read date to the start date. Therefore, when orchestrating the process for fulfilling a particular service request, embodiments automatically evaluate and account for the above variables when fulfilling the particular service request.

Embodiments may automatically account for any details relating to a particular service point for which a service request is performed. For example, a "cut-service" type of service request may need to be performed differently depending on which locale the service request is performed in. Embodiments may also automatically account for any details relating to a head-end vendor at which a service request is performed. For example, each head-end vendor may require different messages (e.g., in terms of the number and types of messages), and these requirements may change over releases of software used by each head-end vendor.

Figure 2:
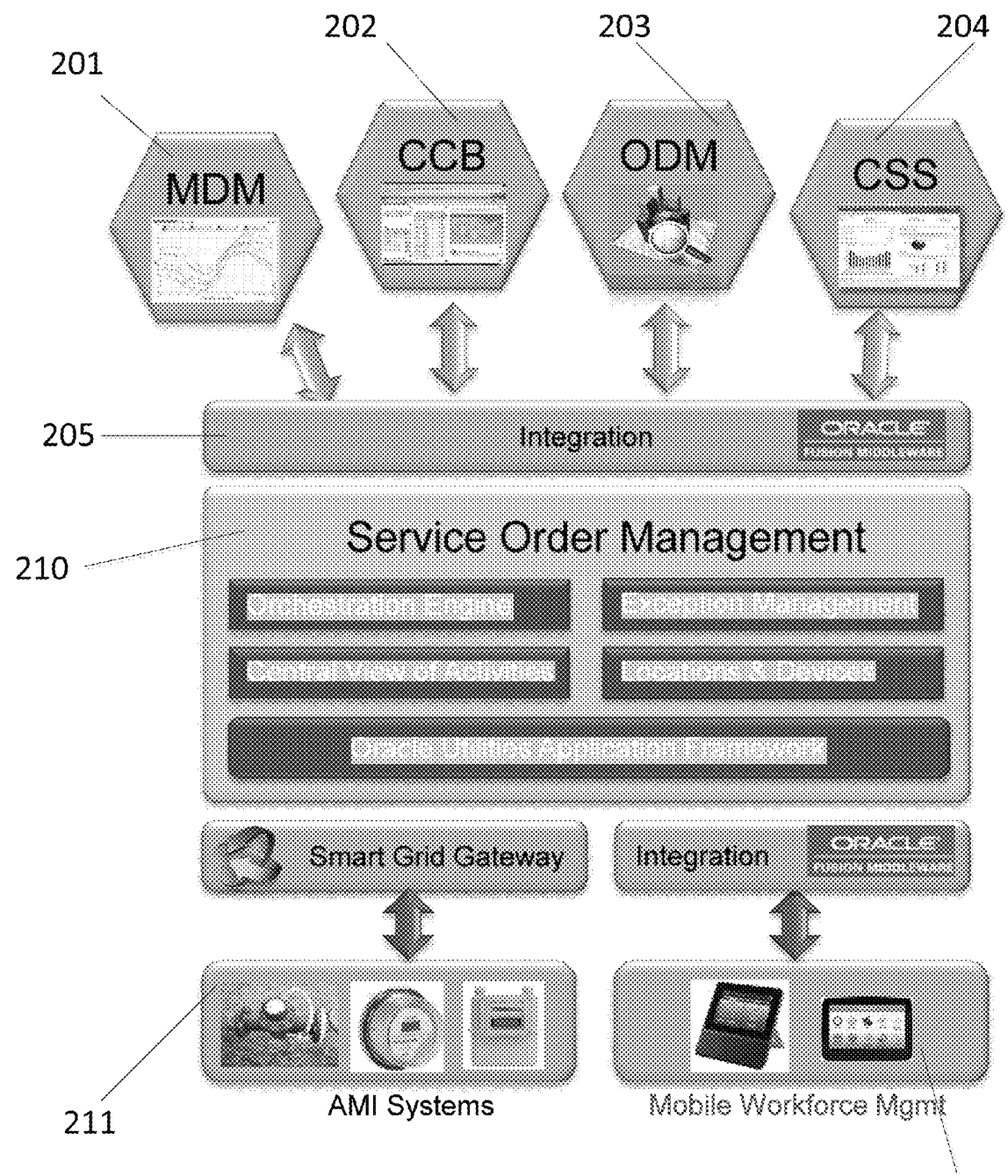
FIG. 2 is an overview block diagram of a system for orchestration of service requests that operates in conjunction with external systems in accordance with one embodiment.

FIG. 2 is an overview block diagram of a system for orchestration of service requests that operates in conjunction with external systems 201-204 in accordance with one embodiment. External systems may include systems such as a meter data management ("MDM") system 201, a customer care and billing ("CCB") system 202, an operation device management ("ODM") system 203 and a customer self-service ("CSS") system 204.

Each of the external systems 201-204 may initiate service requests to be performed. For example, MDM system 201 may initiate investigations relating to the functioning of a device. Investigations are typically field activities that determine the nature of a problem (e.g., no readings are obtainable from a device, no response to commands by the device, etc.). Investigations may result in a meter exchange (i.e., replacing an old meter with a new meter). CCB system 202 may initiate the starting or the stopping of utility services to a customer. A customer may also report issues to a utility organization (which subsequently initiates corresponding service requests) via CCB system 202. CCB system 202 may also initiate disconnecting a customer from utility services due to non-payment by the customer, or connecting the customer to utility services due to resumption of payment by the customer. CCB system 202 may also turn utility services on or off depending on the conditions of use of a pre-paid metering plan by a customer. CCB system 202 may also implement rate changes when determining the cost of using utility services by a customer. CCB system 202 may also initiate the exchanging of meters.

ODM system 203 may also initiate the maintaining/exchanging of devices. ODM system 203 may also implement firmware updates. ODM system 203 may also change configuration settings for devices. ODM system 203 may also determine when and where smart meters are implemented.

CSS system 204 may generally submit issues for investigation. CSS system 204 may also start or terminate service for a customer.

Service requests from external systems 201-204 may be received by service order management system 210. The service requests from external systems 201-204 may also be combined/integrated by middleware 205. Service order management system 210 may orchestrate the fulfillment of the service requests via an orchestration engine. External systems 201-204 and service order management system 210 may be provided by the same provider. In another embodiment, one or more external systems are provided by third parties different than the provider of service order management system 210. As described above, if a particular service request can be automatically fulfilled via electronic command messaging, the system may initiate command messages to a smart device via an AMI system 211. On the other hand, if the service request cannot be automatically fulfilled via command messaging, embodiments may automatically initiate field visits via mobile workforce management system 212.

Upon fulfillment of a service request, the system may send an indication that the service request has been fulfilled. The indication may be sent to systems that await the indication (e.g., external systems 201-204). A system that awaits the indication may or may not have provided the service request to service order management system 210. Embodiments may provide the indication to more than one external system.

Figure 3:
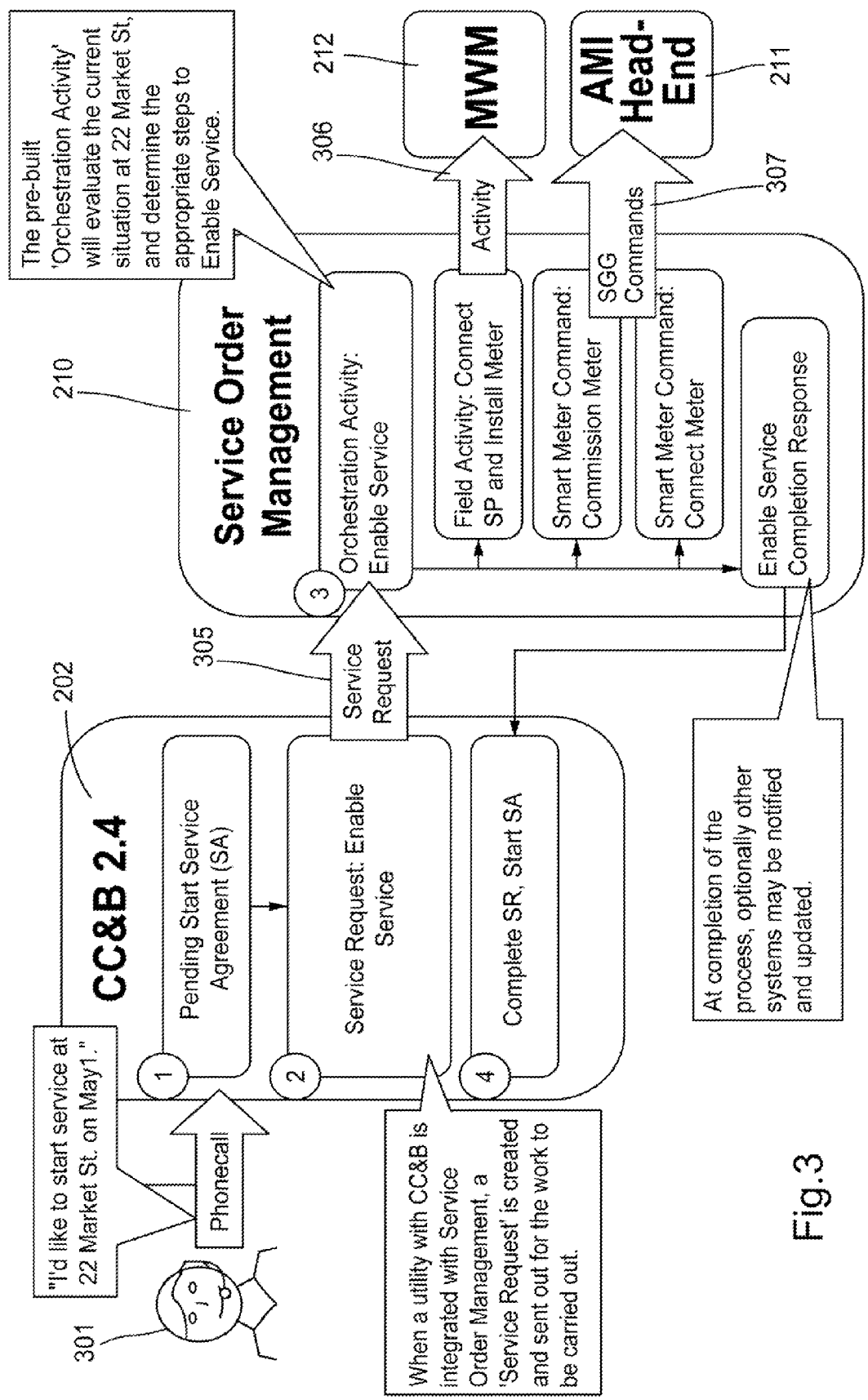
FIG. 3 illustrates a process of receiving and fulfilling a service request by an orchestration system in accordance with one embodiment.

FIG. 3 illustrates a process of receiving and fulfilling a service request by an orchestration system (e.g., service order management system 210) in accordance with one embodiment. As described above, service order management system 210 of FIG. 2 may be in communication with CCB system 202 of FIG. 2. In the example of FIG. 3, a customer may request that utility services start at a particular location (e.g., 22 Market St.), and on a particular day (e.g., May 1), via a telephone call 301 to CCB system 202. Upon receiving the telephone call 301 to start services, CCB system 202 may create a pending start-service agreement to begin the process of starting utility service for the customer. The start-service agreement will remain in a "pending" state until utility service can commence at the location specified by the customer (i.e., until the "enable service" service request has been fulfilled, as described in more detail below). Although the start-service agreement remains in a pending state, an "enable service" service request 305 can be created by CCB system 202 and received by service order management system 210. Once the service request is received by service order management system 210, orchestration of the process of fulfilling the service request can begin via an orchestration engine of service order management system 210. As described above, service order management system 210 will automatically evaluate and account for the various variable conditions for fulfilling the enable service request at the service point (that corresponds to 22 Market Street). As described above, variables that service order management system 210 will take into account may include, but are not limited to: (1) the type of service request, (2) whether the service point is connected to a source of power, (3) whether a device is installed at the service point and the characteristics of the device, (4) the state of any device that is installed at the service point, (5) the characteristics of the head-end that manages any device at the service point, and (6) for non-smart devices, the proximity of a scheduled read date to the start date (e.g., May 1).

If service order management system 210, in the process of fulfilling the "enable service" request, determines that there is no device installed at the service point, then service order management system 210 may create/initiate a field activity 306 for the installing of a device at the service point and for the connecting of the installed device to a source of power. This field activity 306 can then be provided to a mobile workforce management system 212. Once a device (e.g., a smart meter) is installed at the service point by a field crew, the service order management system 210 may issue electronic command messages 307 to the device via the AMI head-end 211 that corresponds to the device. The electronic command messages 307 may be smart-grid gateway ("SGG") commands that are necessary for fulfillment of the service request. In this example, the electronic command messages 307 may instruct the device to be placed in a "commissioned state" and instruct the device to connect to a source of power. After the service order management system 210 has orchestrated fulfillment of the service request, the system can then send an indication that the service request has been fulfilled (e.g., a service completion response). This indication can be sent back to CCB system 202, or any other systems that await the indication. Upon receipt of the indication by CCB system 202, the "pending" state of the start-service agreement is removed to indicate that a service agreement can commence between the customer and the respective utility organization.

Figure 4:
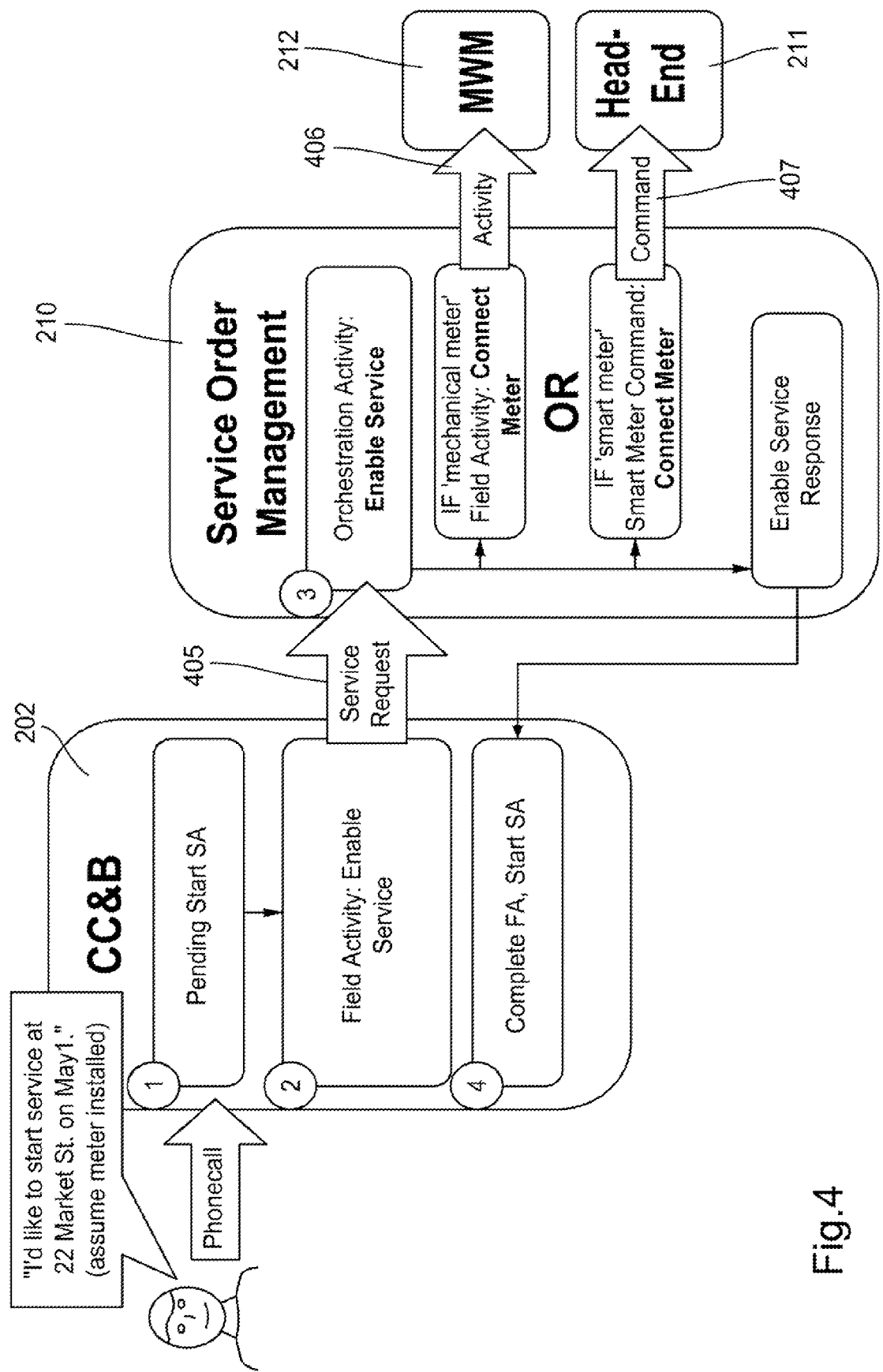
FIG. 4 illustrates another process of receiving and fulfilling a service request by an orchestration system in accordance with one embodiment.

FIG. 4 illustrates another process of receiving and fulfilling a service request by an orchestration system (e.g. service order management system 210) in accordance with one embodiment. Similar to the example of FIG. 3, a customer may request that utility services start at a particular location, and on a particular day, via a telephone call to CCB system 202. In the example of FIG. 4, suppose that a device is already installed at the service point corresponding to the location of requested service. Similar to the example of FIG. 3, once a service request 405 is received by service order management system 210, orchestration of the process of fulfilling the service request can begin via an orchestration engine of service order management system 210. In this example, because service order management system 210 will evaluate and determine that a device is already installed at the service point, service order management system 210 does not need to create any field activity to install a device at the service point. Instead, service order management system 210 will evaluate whether the device at the service point is a "non-smart" device (e.g., a mechanical meter) or a "smart" device (e.g., a smart electric meter). If the device is a non-smart device, service order management system 210 may create/initiate a field activity 406 for the connecting of the mechanical meter to a power source. This field activity 406 may be provided to a mobile workforce management system 212. Alternatively, if the device is a smart device, service order management system 210 may issue electronic command messages 407 to the device via the AMI head-end 211 that corresponds to the device. The electronic command messages 407 may instruct the device to be connected to a source of power.

In another embodiment, the system can receive and fulfill a service request whose fulfillment is accomplished using both an issued command message as well as an initiated field activity. Specifically, in order to fulfill this type of service request, a portion of the service request is fulfilled via an issued electronic command message, and another portion of the service request is fulfilled via an initiated field activity. In one embodiment, the system can orchestrate the fulfillment of each portion of the service request by directing the issuance of appropriate command messages and/or appropriate field activities as needed.

In one embodiment, the received service requests are related to utility devices. Examples of different services that may be orchestrated in accordance with an embodiment of the present invention include, but are not limited to: (1) disabling service, (2) implementing back-to-back service (where one previous customer is disconnected from service and a new customer is connected to service), (3) cutting service of a customer due to non-payment, (4) reconnecting service due to payment, and (5) enabling service. Each of the above service requests has associated command messages that may be sent and/or field activities that may be initiated.

A command message sent to fulfill a service request may depend upon a state of a device at a service point (e.g., a state of a smart meter at a service point). The command messages may include "device decommissioning," "remote connect," "remote disconnect," "on-demand read," and "device decommissioning," for example. A command message may be a command process that comprises one or more sub-commands. For example, in cases where a smart meter is installed at a service point, the command process of a given command may depend upon the head-end system software used to communicate electronically with the meter installed at the service point. For example, the "device decommissioning" command may comprise a sub-command to inform the head-end software system of an identifier number of the installed meter, a second sub-command to establish communications with that meter, and a third sub-command to verify that communication was established successfully.

The field activities typically used to fulfill service requests may depend upon the state of service and the meter at the service point. The field activities may include "connect service point at meter," "connect service point at meter and install meter, connect service point at meter and turn on," "connect service point at source," "connect service point at source and install meter," "connect service point at meter and turn on," "cut service for non-payment," "disconnect service point at meter," "disconnect service point at meter and remove meter," "disconnect service point at source," "disconnect service point at source and remove meter," "install meter," "read meter," "remove meter," "turn on meter," and "turn off meter," for example. Some of these field activities may comprise compounded tasks that serve to save the utility from sending its workers multiple times to a same service point, if all of the compounded tasks of the corresponding field activity can be completed by the same field-work crew. Supplemental information is generally provided along with the field activity to allow a field worker to complete the assigned work, and different supplemental information may be provided depending upon the type of field activity. For example, for a field activity that includes reading a meter, details supplied with the field activity may include a type of read-out provided by the meter (e.g., dial or digital), the number of dials (if dials are present), a maximum dial reading, a number of registers, and a high reading limit/low reading limit based on a customer's historical usage data, for example. Embodiments of the present invention may supply the appropriate supplemental information for each of the field activity types listed above.

In addition to orchestrating the fulfillment of service requests relating to electric utilities, other embodiments may orchestrate the fulfillment of service requests relating to gas, water, or sewage. Embodiments may use Oracle Utilities Application Framework ("OUAF") tools and interfaces.

Figure 5:
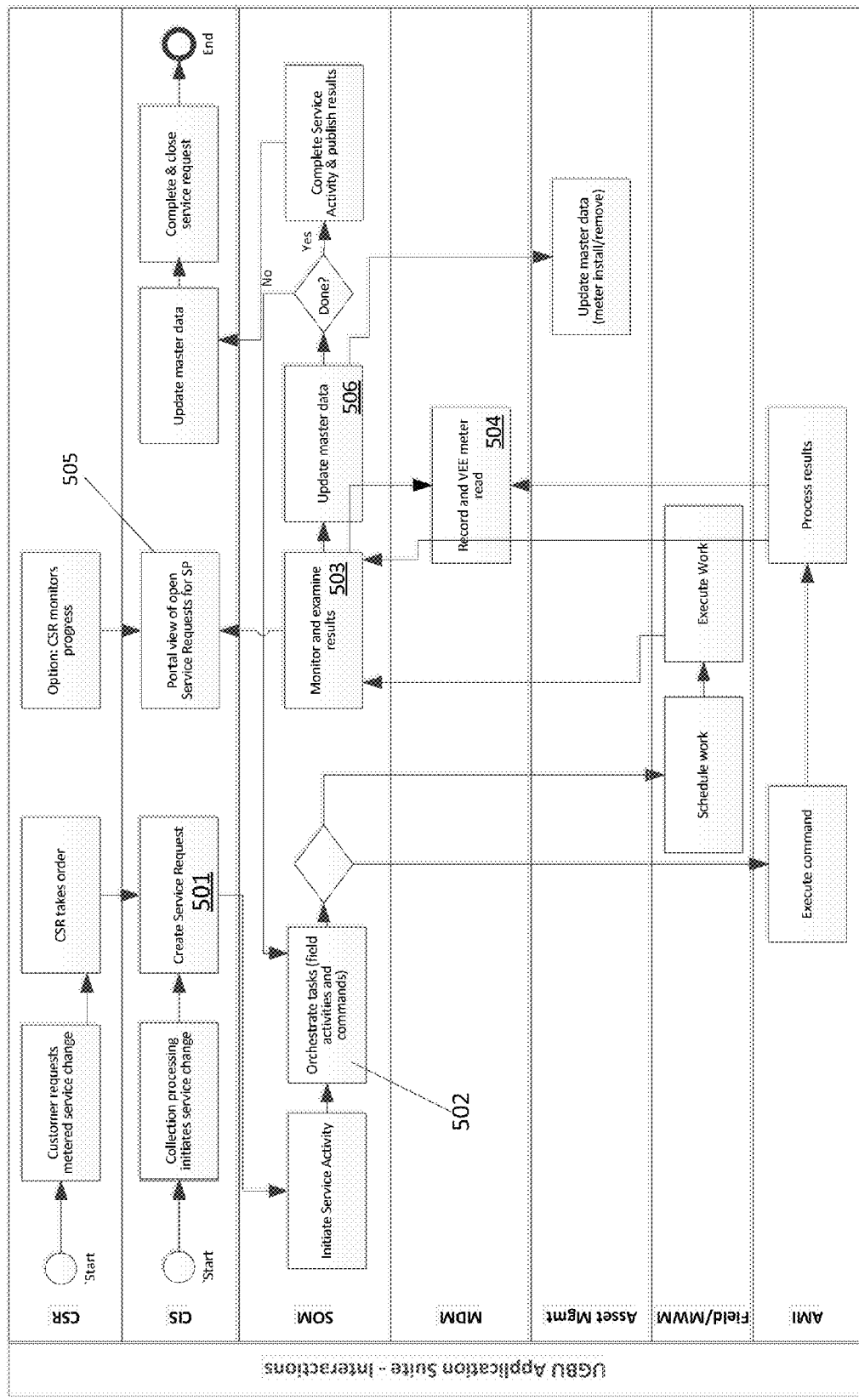
FIG. 5 illustrates another process of receiving and fulfilling a service request in accordance with one embodiment.

FIG. 5 illustrates another process of receiving and fulfilling a service request in accordance with one embodiment. At 501, a service request is sent to a service order management system (e.g., service order management system 210 of FIG. 2). The service request may be initiated based upon requests from a Customer Service Representative ("CSR") system or a Customer Information System ("CIS"). A CSR may generally be understood as a user of a CIS who manually initiates requests to enable/disable utility services. In other embodiments, a service request may originate from the service order management system itself (e.g., "exchange" service requests and "investigate" service requests). At 502, the service order management system orchestrates the process of fulfilling the received service request by instructing an AMI head-end (e.g. AMI head-end 211 of FIG. 2) and/or initiating a field activity for a mobile workforce management ("MWM") system (e.g., MWM system 212 of FIG. 2). At 503, the service order management system may monitor and examine the results of the AMI head-end and the MWM system to determine whether these systems are properly fulfilling the service requests. At 504, an MDM system (e.g., MDM system 201 of FIG. 2) may record and read VEE meter data in conjunction with the monitoring and examination results of 503. Some categories of service requests for meters may read meter data so that usage/cost-of-usage can be calculated, as previously described above. For these types of service requests, the service orchestration engine may invoke an application programming interface to validate and store meter readings. At 505, the service order management system may provide a portal view of open service requests for the service point, providing a consolidated view of all service requests to be fulfilled at the particular service point. At 506, the records of the service order management system may be updated to reflect the results of 503.

Figure 6:
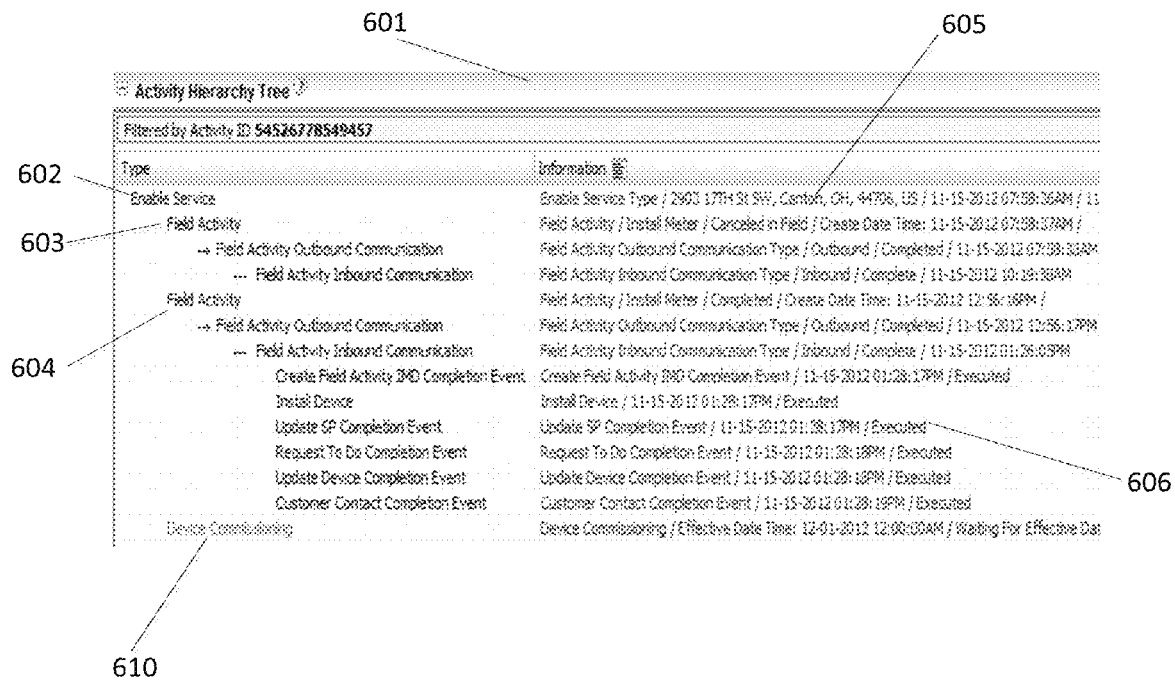
FIG. 6 is a screen shot of field activities that have been created to fulfill a service request, shown via an interface, in accordance with one embodiment.

FIG. 6 is a screen shot of field activities (603, 604) that have been created to fulfill a service request 602, shown via an interface 601, in accordance with one embodiment. Interface 601 displays at least one service request 602 for at least one service point 605. In this example, the location of service point 605 corresponds to "2903 17$^{TH}$ St SW, Canton, Ohio, 44706, US." Interface 601 may also display field activities that have been created to fulfill a specific service request. For example, Interface 601 displays field activities (604, 604) that have been created to fulfill service request 602. Interface 601 also displays whether different communications and events (associated with each field activity) have been completed. For example, interface 601 shows that "Update SP Completion Event" 606 was executed.

As described above, in one embodiment, the system can receive and fulfill a service request whose fulfillment is accomplished using both an issued command message as well as an initiated field activity. This type of service request has a portion to be fulfilled via an issued electronic message, and another portion to be fulfilled via an initiated field activity. Referring again to FIG. 6, service request 602 ("Enable Service") may have a portion that is to be fulfilled by initiated field activities 603, 604. Service request 602 may also have another portion that is to be fulfilled by issued electronic command 610 ("Device Commissioning"). In this example, electronic command 610 may show the commencement of issued electronic commands.

One embodiment provides a single interface that displays all of the received service requests. In another embodiment, a single interface displays all of the received service requests at a specific service point.

Figure 7:
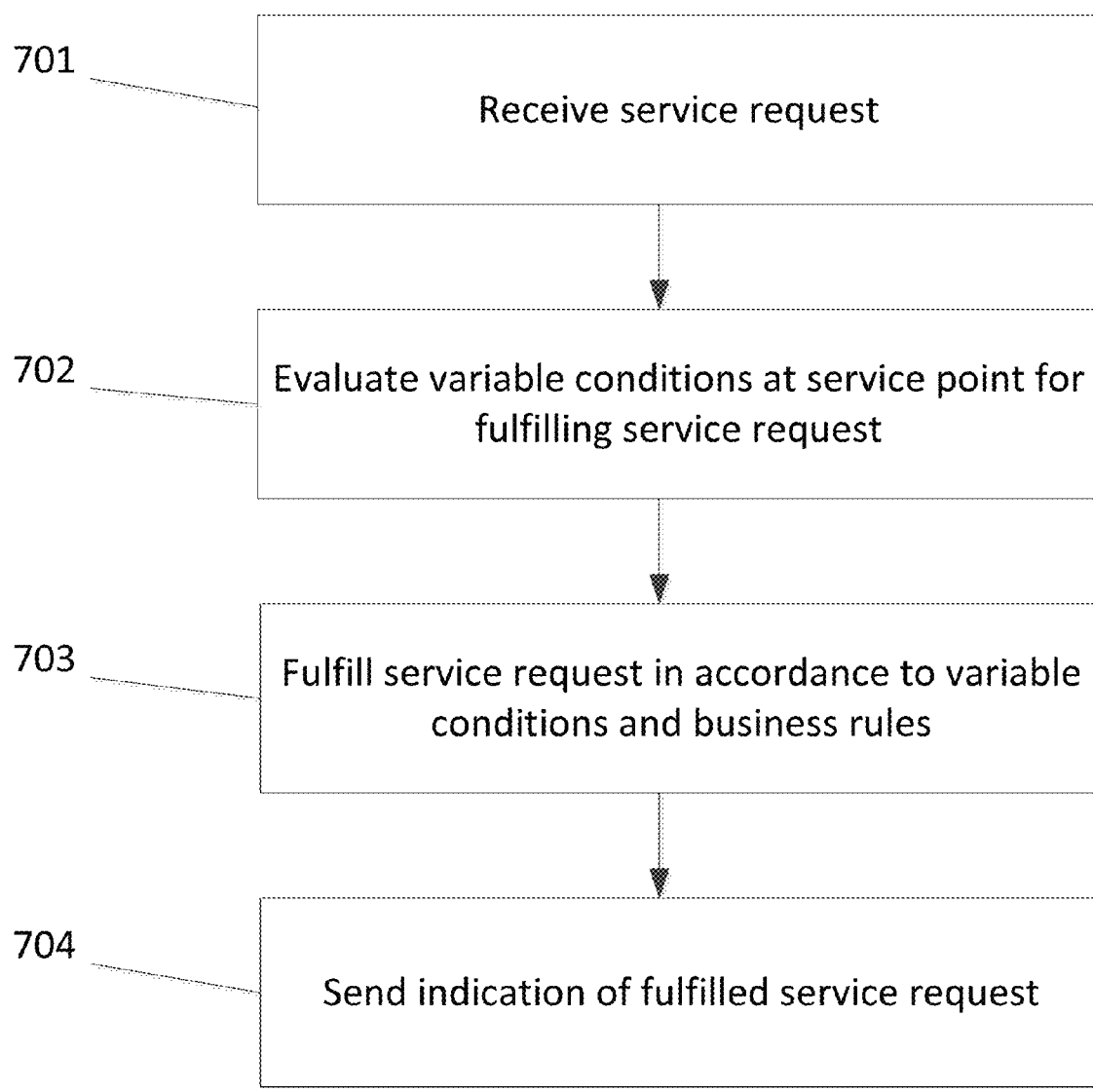
FIG. 7 is a flow diagram of the functionality of the service request orchestration module of FIG. 1 in accordance with one embodiment.

FIG. 7 is a flow diagram of the functionality of the service request orchestration module 16 of FIG. 1 in accordance with one embodiment. In one embodiment, the functionality of the flow diagram of FIG. 7 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 701, a service request is received. As previously described, the service request may be from external systems (e.g., external systems 201-204 of FIG. 2). The service request may be received by a service order management system (e.g., service order management system 210 of FIG. 2). In one embodiment, the service order management system may generate a service request itself.

At 702, a service order management system automatically evaluates various variable conditions that are to be accounted for when fulfilling the service request. As described above, the various variable conditions may be specific to the service point for which the service request pertains. As described above, variable conditions that a service order management system (e.g., service order management system 210) will take into account may include, but are not limited to: (1) the type of service request, (2) whether the service point is connected to a source of power, (3) whether a device is installed at the service point and the characteristics of the device, (4) the state of any device that is installed at the service point, (5) the characteristics of the head-end that manages any device at the service point, and (6) for non-smart devices, the proximity of a scheduled read date to the start date.

At 703, the process of fulfilling the service request is orchestrated in accordance with the variable conditions that have been evaluated in 702 and in accordance with predetermined business rules (that define how to fulfill the service request in view of the variables). As described above, in one embodiment, orchestrating the process of fulfilling the service requests includes orchestrating any field activities and any messaging that is necessary for fulfilling the service requests. The fulfilling of the service requests is performed by a centralized orchestration engine.

At 704, once the service request is fulfilled, an indication that the service request has been fulfilled may be sent. As previously described, the indication may be sent to systems that await the indication (e.g., external systems 201-204).

As described above, embodiments of the present invention are directed to a system that receives service requests and orchestrates the process of fulfilling a service request. The system orchestrates the process of fulfilling the service request by evaluating and taking into account variable conditions that exist at a service point corresponding to the service request. The system then determines the process of fulfilling the service request in accordance to a set of business rules. After the service request is fulfilled, an indication that the service request has been fulfilled may be transmitted to systems that await the indication. Embodiments provide a consolidated view of all of the plurality of work requests to be fulfilled. As such, a centralized system for processing the fulfillment of service requests is provided.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, causes the processor to orchestrate the process of fulfilling service requests for utility services, the orchestrating comprising:

receiving a first service request for utility services, wherein the first service request references a first service point, the first service request being a request to enable or disable a utility at the first service point;

evaluating conditions at the first service point;

automatically issuing an electronic command message to fulfill the first service request based on the evaluation of conditions at the first service point, the electronic command message causing an electric meter installed at the first service point to enable or disable the utility in accordance with the first service request;

receiving a second service request for utility services, wherein the second service request references a second service point, the second service request being a request to enable or disable a utility at the second service point;

evaluating conditions at the second service point; and automatically initiating a field activity to fulfill the second service request by sending an assignment of the field activity to a field work crew via a mobile workforce management system based on the evaluation of conditions at the second service point, wherein the receiving the first service request, the evaluating conditions at the first service point, the automatically issuing the electronic command message, the receiving the second service request, the evaluating conditions at the second service point, and the automatically initiating the field activity are performed by a centralized orchestration engine, wherein the automatically issuing the electronic command message and the automatically initiating the field activity are in accord with predetermined rules that define how to fulfill the requested service in view of the evaluated conditions, wherein the evaluating conditions at the first service point comprises evaluating whether an electric meter is installed at the first service point and a type of the installed electric meter, and the electronic command message is issued upon determining that the installed electric meter is a smart meter, and wherein the evaluating conditions at the second service point comprises evaluating whether an electric meter is installed at the second service point and a type of the installed electric meter, and the field activity is initiated upon determining that no electric meter is installed or that the installed electric meter is a non-smart meter.

2. The non-transitory computer readable medium of claim 1, the orchestrating further comprising:

receiving a third service request for utility services, wherein the third service request references a third service point, the third service request being a request to enable or disable a utility at the third service point, a first portion of the third service request is to be fulfilled by issuance of an electronic command message, and a second portion of the third service request is to be fulfilled by initiation of a field activity;

evaluating conditions at the third service point;

automatically issuing another electronic command message to fulfill the first portion of the third service request; and automatically initiating another field activity to fulfill the second portion of the third service request by sending an assignment of the another field activity via the mobile workforce management system, wherein the receiving the third service request, the evaluating conditions at the third service point, the automatically issuing another electronic command message, and the automatically initiating another field activity are performed by the centralized orchestration engine, and wherein the automatically issuing the another electronic command message and the automatically initiating the another field activity are in accord with predetermined rules that define how to fulfill the requested service in view of the evaluated conditions at the third service point.

3. The non-transitory computer readable medium of claim 1, the orchestrating further comprising providing a consolidated view on a single display of both the first service request and the second service request.

4. The non-transitory computer readable medium of claim 1, the orchestrating further comprising sending an indication to a requesting system that the first service request has been fulfilled.

5. A method for orchestrating the process of fulfilling service requests for utility services, the method comprising:

receiving a first service request for utility services, wherein the first service request references a first service point, the first service request being a request to enable or disable a utility at the first service point;

evaluating conditions at the first service point;

automatically issuing an electronic command message to fulfill the first service request based on the evaluation of conditions at the first service point, the electronic command message causing an electric meter installed at the first service point to enable or disable the utility in accordance with the first service request;

receiving a second service request for utility services, wherein the second service request references a second service point, the second service request being a request to enable or disable a utility at the second service point;

evaluating conditions at the second service point; and automatically initiating a field activity to fulfill the second service request by sending an assignment of the field activity to a field work crew via a mobile workforce management system based on the evaluation of conditions at the second service point, wherein the receiving the first service request, the evaluating conditions at the first service point, the automatically issuing the electronic command message, the receiving the second service request, the evaluating conditions at the second service point, and the automatically initiating the field activity are performed by a centralized orchestration engine, wherein the automatically issuing the electronic command message and the automatically initiating the field activity are in accord with predetermined rules that define how to fulfill the requested service in view of the evaluated conditions, wherein the evaluating conditions at the first service point comprises evaluating whether an electric meter is installed at the first service point and a type of the installed electric meter, and the electronic command message is issued upon determining that the installed electric meter is a smart meter, and wherein the evaluating conditions at the second service point comprises evaluating whether an electric meter is installed at the second service point and a type of the installed electric meter, and the field activity is initiated upon determining that no electric meter is installed or that the installed electric meter is a non-smart meter.

6. The method of claim 5, further comprising:

receiving a third service request for utility services, wherein the third service request references a third service point, the third service request being a request to enable or disable a utility at the third service point, a first portion of the third service request is to be fulfilled by issuance of an electronic command message, and a second portion of the third service request is to be fulfilled by initiation of a field activity;

evaluating conditions at the third service point;

automatically issuing another electronic command message to fulfill the first portion of the third service request; and automatically initiating another field activity to fulfill the second portion of the third service request by sending an assignment of the another field activity via the mobile workforce management system, wherein the receiving the third service request, the evaluating conditions at the third service point, the automatically issuing another electronic command message, and the automatically initiating another field activity are performed by the centralized orchestration engine, and wherein the automatically issuing the another electronic command message and the automatically initiating the another field activity are in accord with predetermined rules that define how to fulfill the requested service in view of the evaluated conditions at the third service point.

7. The method of claim 5, further comprising providing a consolidated view on a single display of both the first service request and the second service request.

8. The method of claim 5, further comprising sending an indication to a requesting system that the first service request has been fulfilled.

9. A system for orchestrating the process of fulfilling service requests for utility services, the system comprising:

a processor;

a memory coupled to the processor;

a first receiving module that receives a first service request for utility services, wherein the first service request references a first service point, the first service request being a request to enable or disable a utility at the first service point;

a first evaluating module that evaluates conditions at the first service point;

an issuing module that automatically issues an electronic command message to fulfill the first service request based on the evaluation of conditions at the first service point, the electronic command message causing an electric meter installed at the first service point to enable or disable the utility in accordance with the first service request;

a second receiving module that receives a second service request for utility services, wherein the second service request references a second service point, the second service request being a request to enable or disable a utility at the second service point;

a second evaluating module that evaluates conditions at the second service point; and a first initiating module that automatically initiates a field activity to fulfill the second service request by sending an assignment of the field activity to a field work crew via a mobile workforce management system based on the evaluation of conditions at the second service point, wherein the first receiving module, the first evaluating module, the issuing module, the second receiving module, the second evaluating module, and the first initiating module are part of a centralized orchestration engine, wherein the automatically issuing the electronic command message and the automatically initiating the field activity are in accord with predetermined rules that define how to fulfill the requested service in view of the evaluated conditions, wherein the evaluating conditions at the first service point comprises evaluating whether an electric meter is installed at the first service point and a type of the installed electric meter, and the electronic command message is issued upon determining that the installed electric meter is a smart meter, and wherein the evaluating conditions at the second service point comprises evaluating whether an electric meter is installed at the second service point and a type of the installed electric meter, and the field activity is initiated upon determining that no electric meter is installed or that the installed electric meter is a non-smart meter.

10. The system of claim 9, further comprising:

a third receiving module that receives a third service request for utility services, wherein the third service request references a third service point, the third service request being a request to enable or disable a utility at the third service point, a first portion of the third service request is to be fulfilled by issuance of an electronic command message, and a second portion of the third service request is to be fulfilled by initiation of a field activity;

a third evaluating module that evaluates conditions at the third service point;

a second issuing module that automatically issues another electronic command message to fulfill the first portion of the third service request; and a second initiating module that automatically initiates another field activity to fulfill the second portion of the third service request by sending an assignment of the another field activity via the mobile workforce management system, wherein the third receiving module, the third evaluating module, the second issuing module, and the second initiating module are also part of the centralized orchestration engine.

11. The system of claim 9, further comprising a providing module that provides a consolidated view on a single display of both the first service request and the second service request.

12. The system of claim 9, further comprising a sending module that sends an indication to a requesting system that the first service request has been fulfilled.

13. The non-transitory computer readable medium of claim 1, wherein at least one of the first and second service requests are received from one or more systems external to the centralized orchestration engine, the one or more systems comprising at least one of a meter data management system, a customer care and billing system, an operation device management system, and a customer self-service system.

14. The non-transitory computer readable medium of claim 13, wherein the orchestrating further comprises combining multiple service requests from different ones of the systems external to the centralized orchestration engine.

15. The non-transitory computer readable medium of claim 1, wherein the conditions at the first and second service points include at least one of: a type of service requested; whether the respective service point is connected to a source of power; whether an electric meter is installed at the respective service point and characteristics of the electric meter; a state of any device installed is installed at the respective service point; characteristics of a head-end that manages any device at the respective service point; or proximity of a scheduled read date of an installed electric meter to a requested utility service start date.

16. The non-transitory computer readable medium of claim 1, wherein the automatically initiating a field activity comprises providing supplemental information along with the assignment of the field activity to the field work crew, the supplemental information depending upon a type of the field activity.

* * * * *